(12) United States Patent
Speciner

(10) Patent No.: US 6,735,213 B2
(45) Date of Patent: May 11, 2004

(54) PROCESSING OF TELEPHONY SAMPLES

(75) Inventor: Michael Speciner, Acton, MA (US)

(73) Assignee: ThinkEngine Networks Inc., Marlborough, MA (US)

( * ) Notice: Subject to any disclaimer, the term of this patent is extended or adjusted under 35 U.S.C. 154(b) by 0 days.

(21) Appl. No.: 09/995,536

(22) Filed: Nov. 28, 2001

(65) Prior Publication Data

US 2003/0099248 A1 May 29, 2003

(51) Int. Cl.[7] .............................................. H04L 12/54
(52) U.S. Cl. ...................................... 370/412; 370/419
(58) Field of Search ................................ 370/412, 413, 370/417, 414, 415, 431, 458, 477, 395.7, 395.62

(56) References Cited

U.S. PATENT DOCUMENTS

| | | | | |
|---|---|---|---|---|
| 6,038,230 A | * | 3/2000 | Ofek ........................... | 370/389 |
| 6,192,428 B1 | * | 2/2001 | Abramson et al. ............. | 710/52 |
| 6,272,132 B1 | * | 8/2001 | Ofek et al. .................. | 370/389 |
| 6,408,351 B1 | * | 6/2002 | Hamdi et al. ................. | 710/63 |
| 6,456,654 B1 | * | 9/2002 | Ginesi et al. ............... | 375/229 |

FOREIGN PATENT DOCUMENTS

WO   PCT/US99/28890   6/2000

* cited by examiner

Primary Examiner—David Vincent
(74) Attorney, Agent, or Firm—Fish & Richardson P.C.

(57) ABSTRACT

Packets containing isochronous samples are received and, without first storing the packets in a jitter buffer, the samples are stored in a buffer at locations chosen based on the times of the samples.

67 Claims, 2 Drawing Sheets

PROCESSING OF TELEPHONY SAMPLES

BACKGROUND

Figure 1:
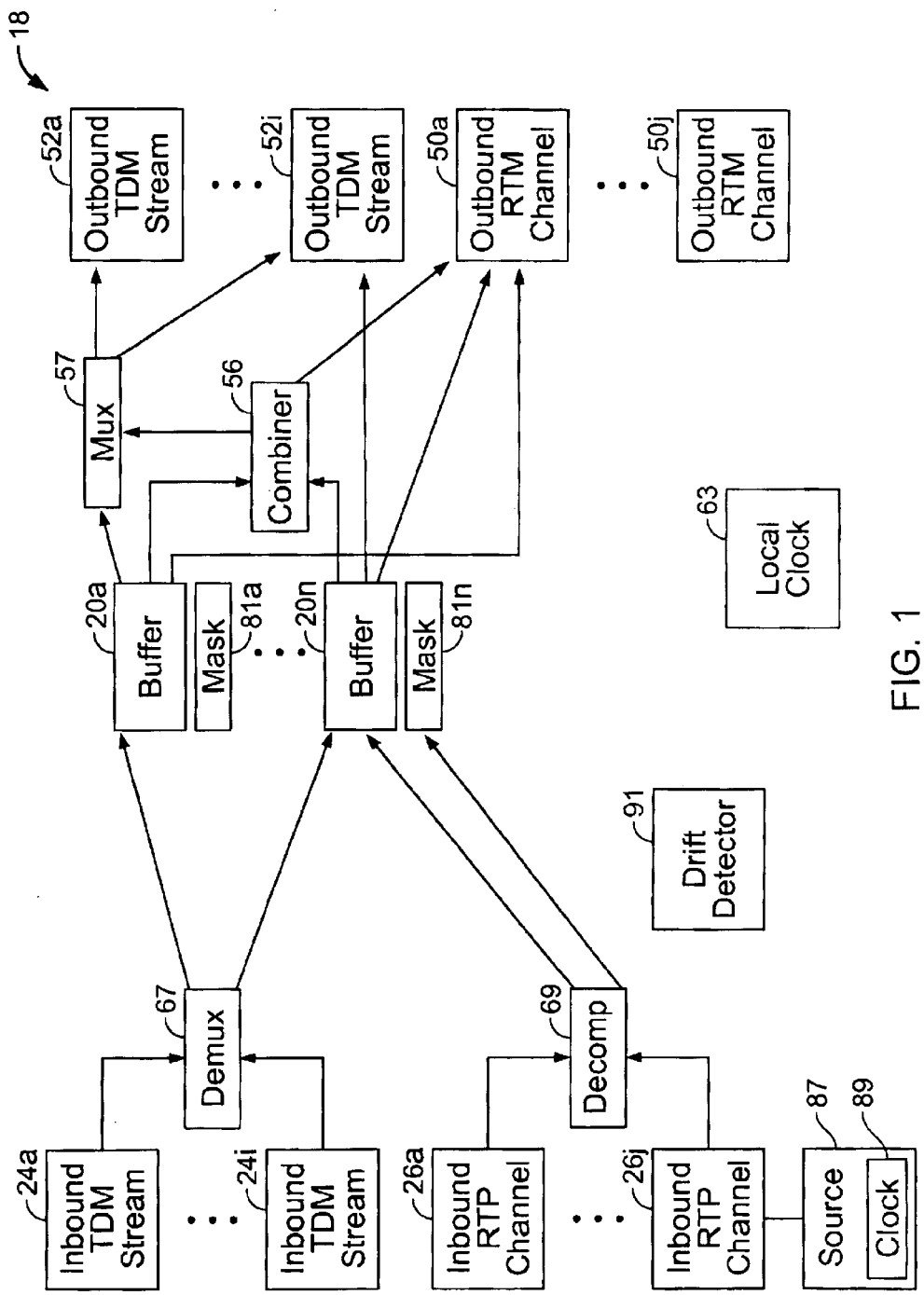

This invention relates to processing of telephony samples.

Telephony samples representing, e.g., voice telephone calls, are sometimes communicated using time division multiplexed (TDM) channels.

To recover the samples belonging to each of the channels, a received TDM stream may be de-multiplexed in a telephony gateway. For use in later communication and processing of each channel, its samples may be encapsulated in packets containing one or more samples per packet, in accordance with a protocol such as the real-time transport protocol (RTP). An RTP packet also includes a header containing a timestamp that represents the time when the first sample in the RTP packet was created. Each RTP packet can be compressed or, if it contains only silence, eliminated altogether. Typical compressed RTP packet formats follow ITU-T recommendation G.723.1 or G.729. We consider G.711 to be an uncompressed format, although the individual samples are encoded using an 8-bit floating point format (A-law or µ-law), as are TDM samples.

A delay occurs between the time of arrival of the first TDM sample that is to become part of an RTP packet and the time when all of the samples for that packet have arrived and can be assembled. For example, a packet that contained 20 milliseconds of samples would be delayed by the 20 milliseconds needed to assemble all of its samples.

In the opposite "direction", samples from incoming RTP packets may be multiplexed into a TDM stream. This is typically done using a set of so-called jitter buffers, one for each of the incoming channels. The communication links that carry incoming RTP packets may cause individual packets to be delayed, or even lost, and the RTP packets may arrive at the gateway in the wrong order. By using the timestamp information in the header of each packet, the arriving packets can be put into the correct order in the jitter buffers, and missing packets can be replaced. Samples decompressed from the first packet in each jitter buffer may then be interleaved to form the multiplexed TDM stream. In order to have samples available when needed, each jitter buffer delays the readout of incoming packets to leave enough time for out-of-order or delayed packets to arrive.

Typically, conferencing of multiple channels is done by combining TDM samples. If any of the voice samples to be conferenced is received as RTP packets, the packets are normally first converted to a TDM stream.

SUMMARY

In general, the invention features a method that includes receiving packets containing isochronous samples and, without first storing the packets in a jitter buffer, storing the samples in a buffer at locations chosen based on the times of the samples.

Implementations of the invention may include one or more of the following features. The isochronous samples are telephony samples. The buffer includes a circular buffer, and consecutive locations in the buffer are associated respectively, at a current time, with a sequence of time values. The samples are also read from locations of the buffer. The location of the buffer associated with the earliest time-value immediately follows the location associated with the latest time value. The time-values associated with at least some of the locations are changed by an amount corresponding to a length of the buffer. The time values are changed at times that are separated by a fixed interval. Some of the locations include consecutive locations that start with a location that is associated with the earliest time value. Consecutive locations of the buffer are associated with successive times including past times, a current time, and future times. The received samples are stored in locations associated with future times and are read at locations associated with past times. The received packets are decompressed before their samples are stored in the buffer. The received packets include packets that comply with a real-time transport protocol (RTP).

Other isochronous samples (e.g., representing another channel) are also received and stored in another buffer at locations chosen based on the times of the other samples. The other samples are read from successive locations of the other buffer in synchronism with the reading of the samples from the first buffer. The samples that are read in synchronism are combined to form a single channel of isochronous samples. Additional channels can be stored in other buffers and combined into one channel. The technique enables conferencing of two or more telephony channels, for example.

Information is maintained that identifies samples that are not valid to be read. The information includes bits each of which indicates whether a single corresponding sample is valid to be read. Or the information includes bits each of which indicates whether a corresponding group of consecutive samples is valid to be read. Or the information can include a list of ranges of locations containing samples that are valid to be read. Or the information includes run-length encoded information.

Filler samples are substituted in locations in the buffer in place of, e.g., non-valid samples. The filler samples are generated based on information contained in other samples. Or the filler samples are generated based on information in subsequent packets.

The reading of samples from the buffer occurs at spaced apart times. Other processing of samples occurs in the intervals between the spaced apart times. The samples are stored in the buffer at locations that are based on timestamp information carried in the packets and on an offset value associated with the channel that carried the packets. Filler samples are stored in the buffer in connection with missing or discarded packets. The offset value is adjusted in response to early- or late-arriving packets which may be due to the drifting of a source clock used in assembling the packets.

In general, in another aspect, the invention features apparatus that includes a buffer configured to accept isochronous samples of packets and to store the samples at locations of the buffer that are chosen based on the times of the samples.

Among other advantages, the invention allows isochronous mixing of TDM and RTP data in a way that minimizes delay and accommodates the simultaneous use of a variety of RTP packet sizes, latencies, and latency variations (jitter).

Other advantages and features will become apparent from the following description and from the claims.

Figure 2:
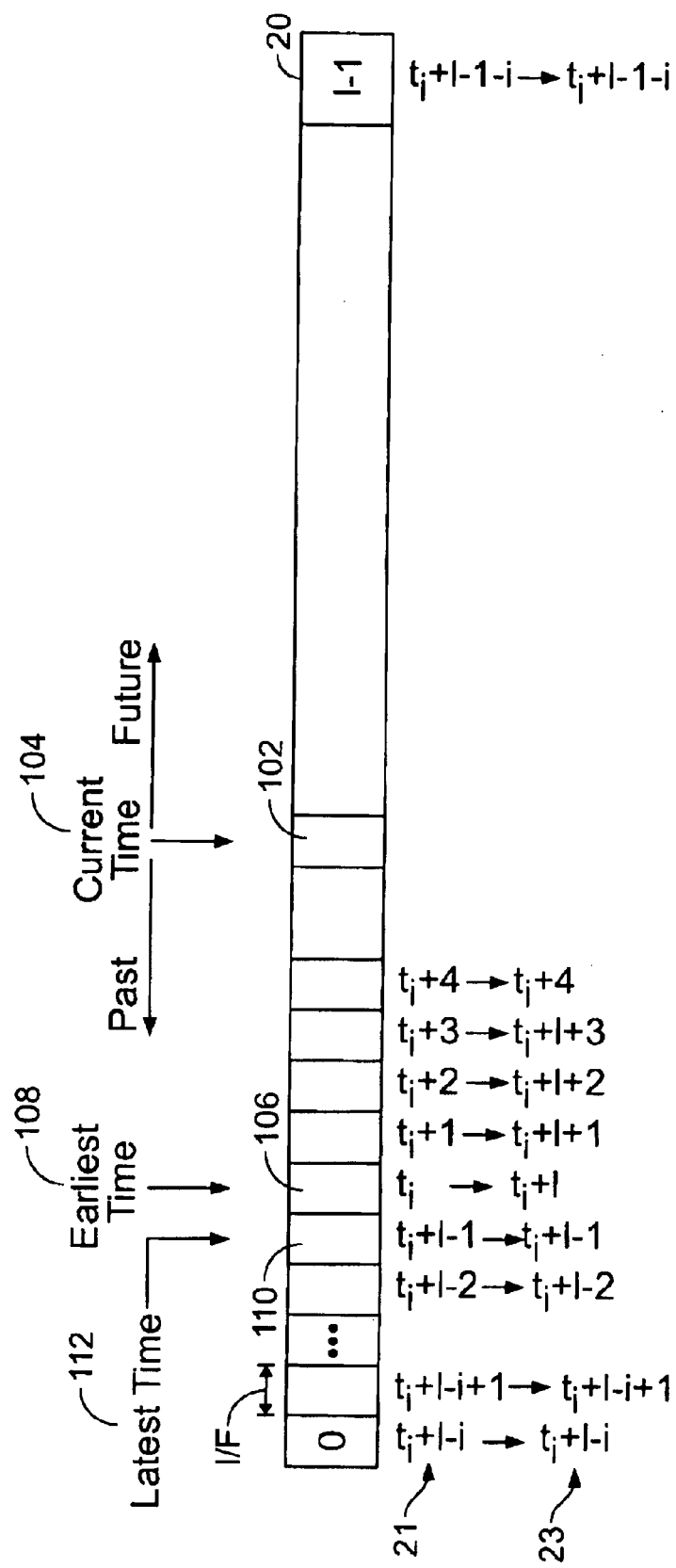

DESCRIPTION (FIG. 1 shows a block diagram.
FIG. 2 shows a buffer.)

The Buffers

In FIG. 1, a gateway 18 includes a set of circular buffers 20a to 20n, one for each of n inbound channels of telephony data to be processed and perhaps others to hold generated outbound data. The inbound channels may include the channels of TDM streams 24a to 24i (each bearing multiple channels) and RTP packet channels 26a to 26j.

As shown in FIG. 2, each of the circular buffers 20 (also called S-queues) has consecutive storage locations 0 through l−1, where l is the fixed length of each of the buffers. The locations are intended to hold consecutive samples of the corresponding telephony channel in the order in which the samples were created. The samples are written into the locations of the buffer from the inbound channel. When consecutive locations in a buffer hold a sequence of valid samples, the samples can be read and used in one or more outbound RTP channels 50a to 50i (FIG. 1) or in the channels carried by one or more outbound TDM streams 52a to 52i.

The reading of samples from different buffers is done synchronously. Thus, in forming the outbound streams, the samples of more than one of the buffers can be mixed or combined in one or more combiners 56, for example, for telephone conferencing purposes, and then fed to an outbound S-queue or to an outbound RTP channel or through one or more multiplexers 57 into one or more of the outbound TDM streams.

Each of the outbound RTP channels may carry samples from a single buffer, or a combination of samples from two or more of the buffers. And each of the outbound TDM streams may carry multiple channels each of which is either drawn from a single buffer or combined from samples held in multiple buffers.

Samples in an inbound channel are written directly into locations in the corresponding buffer without the use of a classic jitter buffer to hold packets temporarily. Because the packets of an RTP channel may arrive out of order, or may be lost in transmission, the samples of successively received RTP packets for a channel are not necessarily written into successive locations of the buffer. Rather the samples are written into locations of the buffer that are determined by their timestamps.

In the case of an inbound TDM stream, samples of a given channel carried in the stream are de-multiplexed in one of a set of one or more de-multiplexers 61 and are written immediately in order of receipt into consecutive locations of the corresponding buffer.

By controlling the locations in each buffer into which incoming samples of the associated channel are written, a variety of RTP packet sizes, latencies, and latency variations (jitter) can be accommodated without requiring a separate jitter buffer or the conversion of RTP samples to a TDM format. Also, TDM and RTP data can be mixed with minimum delay. As a result, telephony features, such as telephone conferencing and others that may or may not require mixing, can be provided effectively and efficiently.

Time Indexing of Buffers

Each buffer is "time indexed" in that the consecutive locations in the buffer are associated with respective consecutive moments in time that are separated by the sampling interval 1/f used when the samples were created, where f is the sampling frequency.

As shown in FIG. 2, at any given moment, one of the locations 102 in the buffer is associated with a current time 104. Locations that are ahead of (to the right of) the current-time location in the buffer represent future times, while locations that are behind (to the left of) the current-time location represent past times.

One of the past-time locations 106 is associated with the earliest-time 108 of any of the locations in the buffer. Location 110 immediately before the earliest-time location is associated with the latest-time 112 of any of the locations in the buffer. The buffer is circular in that the leftmost location is considered to immediately follow the rightmost location.

For example, suppose that at a given moment, location 106 is associated with the earliest telephony time $t_i$ of any location in the buffer. Then, other locations are associated with times as indicated in row 21 of FIG. 2.

At any given time, a fixed portion (i.e., a fixed number of locations) of each buffer is reserved for the past samples and is considered to be read-only. The rest is reserved for future samples and can be written. Typically, the portion reserved for past samples is sized to hold just enough samples to make up the largest allowed outgoing packet payload.

An incoming packet is considered to be too far into the future if it contains one or more future samples that would be placed in the buffer beyond the portion reserved for future samples (either because it falls in the past sample portion or because it laps the past data.)

Reading and Writing of Samples in the Buffers

Any number of samples (up to the whole buffer length) could be written to or read from the buffer as a group. The locations at which reading and writing are done in different buffers may differ at a given time. Reading and writing from a buffer can be done at the same time, because the samples to be read and the samples to be written are necessarily in non-overlapping regions of memory.

When samples are read from a buffer, they are always read from consecutive past-time locations. Inbound samples are always written into a buffer at the current-time location and later locations. Computed samples (e.g., sums from conferencing) are written to past-time locations having the same time-locations as the samples used in the computation.

In the case of a TDM stream, after de-multiplexing in real time in a demultiplexer 67, each sample (or a block of samples) for a channel is written into the buffer beginning at the current-time location.

In the case of RTP packets, after the packets are decompressed in a decompressor 69 (there can be more than one decompressor for handling multiple channels), they are available for writing into the corresponding buffer. Each RTP sample is stored in a location determined by the timestamp of and its position within the RTP packet from which it was taken and by a channel-dependent offset value.

Offset Value

The offset is a value that is added to the timestamp from an RTP packet to convert it into a local time that is somewhat in the future relative to the time when the first sample of the packet was generated. This offset accommodates the delay that is inherent between the time that the first sample was generated and the time when all of the samples of the packet have been assembled and the packet has been created, as well as transmission delay. In effect, the offset associates the samples of the packet with times that relate to future-time locations in the buffer. After the samples are written, as time passes, the future-time locations become past-time locations, and their samples can be read from the buffer as needed.

The channel-dependent offset can be computed in a variety of ways. The timestamp in an RTP packet gives the time when its first sample was created, but offset by an arbitrary (but fixed per channel) constant. We define the timestamp time to be the timestamp minus the constant.

If real-time transport control protocol (RTCP) data is available for the RTP channel, it is possible to directly correlate the RTP timestamp with the local time at the gateway. Therefore, the constant can be computed as the RTP timestamp minus local time (as expressed in units of the sampling interval). The offset is then the buffer delay minus the constant.

If RTCP is not available, the constant can be assumed to be the received timestamp plus the packet payload length in sampling intervals minus the reception time of the first packet received for that channel. (Essentially, this assumes that there is no transmission delay.) As before, the offset is set to the buffer delay minus the constant.

If we define the packet delay of a packet as the difference between the packet's local reception time and the timestamp time of its first sample, then the buffer delay is the maximum allowed packet delay on a given channel. Adding the buffer delay to each packet's timestamp (by including it in the per channel offset computation) allows each packet to appear to be in the future even if it arrives relatively late compared to other packets on the same channel. Of course, even packets that arrive quickly will be delayed by the buffer delay, so the offset should be chosen as small as possible consistent with preventing a plethora of packets from arriving too late to be used. The scheme to adjust for clock drift, described later, will also effectively adjust the buffer delay if it is initially chosen too small. Traditionally, buffer delay is defined as the maximum allowed difference between packet delays on a given channel. We are adding in the minimum packet delay.

Quantized Clocking of Memory Operations

A clock 63 (FIG. 1) tracks the current local time.

Assume that all of the inbound and outbound channels use a sampling frequency of f (e.g., 8000 samples per second) resulting in a sampling interval of 1/f. Time is tracked in discrete units t such that ft is always integral.

The processing of samples in the buffers is cadenced by successive ticks of a quantized clock occurring, for example, every 40 sampling intervals (40/f). In effect, time stands still during the interval between one tick and its successor. The appearance of each tick signals the quantized advancing of time. When a tick occurs, the current-time location 102 is moved ahead by forty locations (in our example), and the times associated with forty of the buffer locations beginning with the earliest-time location 106 are each advanced to a time that is 1 time units later. The times associated with the rest of the locations remain unchanged.

In a different example, if each tick were associated with an advancing of the times for a set of four locations at once, the new associated telephony times would be as shown in row 23 of FIG. 2. This updating has the effect of moving the earliest-time location and the latest time location, four places to the right.

The number of samples per tick is normally based on typical packet sizes. In one system, for example, TDM data is converted into 5 ms packets, and the number of samples per tick is chosen as 40 samples per tick. In common usage, RTP packets are 10, 20 or 40 ms, each of which is an integral multiple of the 40 samples per tick.

During the interval between two ticks, writing of incoming samples into the buffers can proceed asynchronously as samples arrive and are ready to be stored. Processing and reading of samples in the buffers can be done in a foreground loop that includes generation of filler samples, combining of channels of samples to achieve conferencing, assembling of samples to form outbound RTP packets, and transmission of the packets.

Tracking Valid Samples

A sample that is stored in a location in a buffer remains there until it is overwritten by another sample. As time passes and the times associated with the locations are advanced, the buffer is lapped and incoming samples are written over previously stored samples. If the overwriting occurred for every consecutive location, all samples in the buffer would always be fresh and valid for reading.

However, circumstances may preclude writing valid fresh samples into every consecutive location. For example, an incoming RTP packet may be received much earlier or much later than the original packet order would imply. The offset value, if obeyed, could cause samples of the packet to be stored in the past (for a packet that arrives too late) or stored too far into the future (for a packet that arrives much too early). Because neither of those possibilities is acceptable, the packet may simply be dropped, and the locations in the buffer that would have received those samples then will not contain valid samples.

By keeping track of the locations that contain invalid samples, filler samples can be stored in place of the lost samples, to complete the sequence. (The same concern does not apply to TDM samples, which are reliably received and stored immediately in consecutive locations in the buffer.)

One way to track the locations in which the dropped packets would otherwise have been stored is to maintain a bit mask 81a–81n in parallel with each of the buffers. One example of such a bit mask is as long as the buffer, contains one bit for each of the buffer locations, and is indexed in the same manner as the buffer. A 1-bit indicates that the corresponding sample is valid and a 0-bit indicates that the corresponding sample is invalid. The bits of the mask are set and cleared as follows:

A bit in the mask is set valid for each sample that is newly written into one of the future-time locations. When the ticking of time causes a location to change from a future-time location to a past-time location, the corresponding bit of the bit mask is checked to see if the sample is invalid, indicating that a filler sample must be added. If so, the filler sample is added. If not, the sample is left alone, and the bit in the mask is cleared in preparation for the next lap. When the location again becomes associated with a future-time, if it is not filled by a valid sample, the need for filling will be detected as the location passes into the past-time portion of the buffer.

If bitset and bitclear are atomic operations, there is no problem with race conditions. Otherwise, the usual techniques can be applied to make these operations appear atomic (and possibly for multiprocessor memory coherency, if input and output are handled by different processors).

One way to generate filler samples to be stored in the invalid-sample locations is based on samples found at locations on either side of the location to be filled, or on statistical properties of the sample stream, or on redundant samples received in subsequent packets. Some formats for RTP packets include information about samples in previous packets. This information could be used to replace samples in lost packets.

Instead of using a bit mask having one bit per location, valid and invalid sample locations can be tracked using one bit per multiple sample locations, provided that each chunk of samples is read and written as a unit. That would be the case if packet payloads were always a multiple of the chunk size. In that case, the quantized clock ticks discussed earlier could be spaced apart by the amount of time spanned by a chunk. Other systems can be used for indicating valid samples, including lists of ranges of locations or run length encoding of the bit mask.

Another validity bitmask scheme maintains a bitmask of validity bits only for future samples, with the least significant bit (LSB) representing the chunk of samples starting at the present time. When the quantized clock ticks, the LSB is checked to see if ersatz data must be substituted (bit=0), and the bitmask is shifted right by one bit (shifting in a zero from the left). When a chunk of samples is received for an interval k ticks in the future, 1<<k is or'd into the bitmask. This technique works well when the bitmask is at most a few machine words and the shifting and setting of bits occur in the same process. Using this technique when shifting and setting occur in different processes requires synchronization so that a tick does not occur while k is being computed and used.

Clock Drift

The clock 89 that is used at the source 87 of an RTP channel to generate the timestamp may drift relative to the local clock 63 at the gateway. Successive packets received on the channel then will appear to have timestamp times that get later and later or earlier and earlier relative to a non-drifting clock. The drifting can be detected by a drift detector 91 and used to compensate the offset for that channel on the fly.

The adjustment of the offset could be made when the time drift would be enough to cause a received RTP packet to be stored either (a) at least partially in the past or (b) more than a fixed amount of time into the future. The fixed time should be small enough to ensure that packet samples will not be dropped for a lack of space in the future part of the S-queue. It could be smaller to reduce the packet delay. If packets are drifting towards the future, then in steady state packets are delayed by the fixed time, so it should be no more than the maximum allowable delay.

If the drift would cause the packet to be placed too far into the future, the offset for its channel is decreased just enough to place it within the maximum fixed amount after the current-time. If the drift would cause the packet to be placed at least partially in the past, the offset for its channel is increased just enough to place it entirely in the future.

To prevent (a) a single packet that is excessively delayed from causing an unfavorably large adjustment of the offset (rather than just dropping the packet) and (b) the unfavorable effects of changing the offset too suddenly, the offset may be increased or decreased by only a small amount at one time, e.g., on the order of the time spanned by a typical size packet for that channel. In addition, no adjustment should be made for a received packet placed at least partially in the past if a packet with a more recent timestamp has previously arrived (as determined by the information tracking valid samples). Other techniques for determining offset adjustment are possible, but the offset should not be changed so often as to cause undesirable audible artifacts.

Pass-Through of RTP Packets

If desired, RTP packets on a particular inbound channel can be routed around the buffer and be delivered directly as RTP packets to an outbound channel (having a compatible packet size), avoiding normal jitter delay, as is commonly done. The packets will still need to be processed through a jitter buffer or an equivalent device at a downstream location. If needed for other purposes, the same RTP packet can be stored into one of the buffers in the manner discussed above.

Size of Buffers

The length l of each buffer can be chosen to handle, e.g., 240 milliseconds of samples or other periods in the range of 80 to 480 milliseconds, for example.

l is typically large enough so that the buffer can store (a) an outbound RTP packet's worth of past samples, (b) as many future samples as correspond to the maximum delay of inbound samples, and (c) an inbound packet's worth of future samples. In some implementations, the buffers may be even larger.

The size of the buffers may depend on other considerations. For example, if all RTP packets contain a multiple of p samples, each buffer may be a multiple of p samples long, for convenience. If the buffers are stored contiguously in a cached memory system, each buffer may conveniently contain an integral number of cache blocks or cache lines. To avoid cache collisions between synchronous samples in different buffers, the integer should be odd (assuming the cache size is a power of 2).

Implementation

The buffers and associated functions can be implemented in software, firmware, or hardware, or combinations of them. The hardware may include computers, handheld devices, and other machines. Such devices may include processors, memory, buses, peripheral devices, mass storage, network interfaces, communications facilities, drivers, and other elements that are controlled by software, firmware, or hardware.

Other embodiments are within the scope of the following claims. For example, inbound TDM sample streams may be converted to RTP packets before being written into the buffers.

The techniques described above can be applied not only in a telephony gateway, but in any device in which packet samples, whether voice or not, are processed.

What is claimed is:

1. A method comprising
   receiving packets containing isochronous samples, and
   without first storing the packets in a jitter buffer, storing the samples in a buffer at locations chosen based on the times of the samples, the order of the samples in the buffer being possibly different from the order in which the samples arrive.

2. The method of claim 1 in which the isochronous samples comprise telephony samples.

3. The method of claim 1 in which the buffer comprises a circular buffer.

4. The method of claim 1 in which consecutive locations in the buffer are associated respectively, at a current time, with a sequence of time values.

5. The method of claim 1 also including reading the samples from locations of the buffer.

6. The method of claim 1 in which the locations are associated with respective time values.

7. The method of claim 6 in which a location of the buffer associated with an earliest time-value immediately follows a location associated with the latest time value.

8. The method of claim 4 also including
   changing the time values associated with at least some of the locations by an amount corresponding to a length of the buffer.

9. The method of claim 4 also including
   changing the time values associated with at least some of the locations at times that are separated by a fixed interval.

10. The method of claim 8 in which the some locations includes consecutive locations that start with a location that is associated with the earliest time value.

11. The method of claim 1 in which
    consecutive locations of the buffer are associated with successive times including past times, a current time, and future times.

12. The method of claim 1 in which the received samples are stored in locations associated with current and future times and are read at locations associated with past times.

13. The method of claim 1 in which the received packets are decompressed before their samples are stored in the buffer.

14. The method of claim 1 in which the received packets include packets that comply with a real-time transport protocol (RTP).

15. The method of claim 1 also including
receiving other isochronous samples,
storing the other samples in another buffer at locations chosen based on the times of the other samples; and
reading the other samples from successive locations of the other buffer in synchronism with the reading of the samples from the buffer in which the samples were stored.

16. The method of claim 15 also including
combining the samples that are read in synchronism to form a single channel of isochronous samples.

17. The method of claim 1 also including
maintaining information identifying samples that are not valid to be read.

18. The method of claim 17 in which the information comprises bits each of which indicates whether a single corresponding sample is valid to be read.

19. The method of claim 17 in which the information comprises bits each of which indicates whether a corresponding group of consecutive samples is valid to be read.

20. The method of claim 17 in which the information comprises a list of ranges of locations containing samples that are valid to be read.

21. The method of claim 20 in which the information comprises run-length encoded information.

22. The method of claim 1 also including
substituting filler samples in locations in the buffer in place of samples.

23. The method of claim 22 in which the filler samples are generated based on information contained in other samples.

24. The method of claim 22 in which the filler samples are generated based on information in subsequent packets.

25. The method of claim 5 in which reading of samples from the buffer occurs at spaced apart times, and other processing of samples occurs in the intervals between the spaced apart times.

26. The method of claim 1 in which the samples are stored in the buffer at locations that are based on timestamp information associated with the samples and on an offset value associated with a channel that carried the packets.

27. The method of claim 26 in which filler samples are stored in the buffer in connection with the discarding of samples.

28. The method of claim 26 in which the offset value is adjusted in response to early- or late-arriving packets.

29. The method of claim 28 in which the early- or late-arriving packets are due to the drifting of a source clock used in assembling the packets.

30. Apparatus comprising
a buffer configured to accept isochronous samples of packets and to store the samples at locations of the buffer that are chosen based on the times of the samples, the order of the samples in the buffer being possibly different from the order in which the samples arrive.

31. The apparatus of claim 30 in which the buffer comprises a fixed number of locations associated with respective times.

32. The apparatus of claim 30 in which a location that is associated with a latest one of the times is positioned immediately before a location that is associated with an earliest one of the times.

33. The apparatus of claim 30 also including another buffer configured to accept other isochronous samples of packets and to store the other samples in locations of the other buffer that are chosen based on the times of the samples.

34. A method comprising
receiving packets containing isochronous samples;
storing the samples in a buffer at locations chosen based on time values of the samples;
associating the locations in the buffer with time values; and
changing the time values associated with at least some of the locations.

35. The method of claim 34 wherein
changing the time values further comprises changing the time values by an amount corresponding to a length of the buffer.

36. The method of claim 34, further comprising
storing the samples in the buffer without first storing the packets in a jitter buffer.

37. The method of claim 34 in which the time values are changed at times that are separated by a fixed interval.

38. The method of claim 34 in which the locations include consecutive locations that start with a location that is associated with the earliest time.

39. The method of claim 34 in which consecutive locations are associated with a sequence of time values.

40. A method comprising
receiving packets containing a first set of isochronous samples;
receiving a second set of isochronous samples;
storing the first set of isochronous samples in a first buffer;
storing the second set of isochronous samples in a second buffer; and
reading the second set of isochronous samples from the second buffer in synchronism with the reading of the first set of isochronous samples from the first buffer.

41. The method of claim 40 in which at least one of the first set of isochronous samples and second set of isochronous samples comprises telephony samples.

42. The method of claim 40 further comprising
choosing the location for storing the samples in the first and second buffers based on timestamp information associated with the samples.

43. The method of claim 40 further comprising storing the samples without first storing the packets in a jitter buffer.

44. The method of claim 40 further comprising
combining the samples that are read in synchronism to form a single channel of isochronous samples.

45. The method of claim 40 in which the locations are associated with respective time values.

46. A method comprising
receiving packets containing isochronous samples,
storing the samples in a buffer at locations chosen based on the times of the samples, the order of the samples in the buffer being possibly different from the order in which the samples arrive, and maintaining information identifying samples that are not valid to be read.

47. The method of claim 46 further comprising
reading the samples from locations of the buffer.

48. The method of claim 46 in which the information comprises bits each of which indicates whether a single corresponding sample is valid to be read.

49. The method of claim 46 in which the information comprises bits each of which indicates whether a corresponding group of consecutive samples is valid to be read.

50. The method of claim 46 in which the information comprises a list of ranges of locations containing samples that are valid to be read.

51. The method of claim 46 in which the information comprises run-length encoded information.

52. The method of claim 46 in which the locations are associated with respective time values.

53. The method of claim 46 in which the buffer comprises a circular buffer.

54. A method comprising receiving packets containing isochronous samples, storing the samples in a buffer at locations chosen based on the times of the samples, and substituting filler samples in locations in the buffer in place of samples.

55. The method of claim 54 in which the filler samples are generated based on information contained in other samples.

56. The method of claim 54 in which the filler samples are generated based on information in subsequent samples.

57. The method of claim 54 in which filler samples are stored in the buffer in connection with the discarding of samples.

58. The method of claim 54 in which the locations are associated with respective time values.

59. The method of claim 54 further comprising reading the samples from locations of the buffer.

60. A method comprising receiving packets containing isochronous samples, and storing the samples in a buffer at locations chosen based on the times of the samples and an offset value.

61. The method of claim 60 wherein the offset value is associated with a channel that carried the packets.

62. The method of claim 60 further comprising adjusting the offset value in response to early- or late-arriving packets.

63. The method of claim 62 in which the early- or late-arriving packets are due to the drifting of a clock.

64. The method of claim 63 in which the clock is a source clock used in assembling the packets.

65. The method of claim 60 in which the samples are stored in the buffer without first storing the packets in a jitter buffer.

66. The method of claim 60 in which the locations are associated with respective time values.

67. The method of claim 60 in which filler samples are stored in the buffer in connection with the discarding of samples.

* * * * *